US010924325B2

(12) United States Patent
Rao

(10) Patent No.: US 10,924,325 B2
(45) Date of Patent: Feb. 16, 2021

(54) MAPS HAVING A HIGH BRANCHING FACTOR

(71) Applicant: Gigamon Inc., Santa Clara, CA (US)

(72) Inventor: Anil Rao, Santa Clara, CA (US)

(73) Assignee: Gigamon Inc., Santa Clara, CA (US)

( * ) Notice: Subject to any disclaimer, the term of this patent is extended or adjusted under 35 U.S.C. 154(b) by 0 days.

(21) Appl. No.: 15/815,524

(22) Filed: Nov. 16, 2017

(65) Prior Publication Data

US 2018/0145916 A1 May 24, 2018

Related U.S. Application Data

(60) Provisional application No. 62/425,577, filed on Nov. 22, 2016.

(51) Int. Cl.
| | |
|---|---|
| *H04L 12/24* | (2006.01) |
| *H04L 12/46* | (2006.01) |
| *H04L 29/08* | (2006.01) |
| *H04L 12/26* | (2006.01) |
| *H04L 12/931* | (2013.01) |
| *H04L 12/751* | (2013.01) |
| *H04L 12/851* | (2013.01) |

(52) U.S. Cl.
CPC ........ *H04L 41/046* (2013.01); *H04L 12/4633* (2013.01); *H04L 41/12* (2013.01); *H04L 41/22* (2013.01); *H04L 43/022* (2013.01); *H04L 43/028* (2013.01); *H04L 43/062* (2013.01); *H04L 43/12* (2013.01); *H04L 45/02* (2013.01); *H04L 47/24* (2013.01); *H04L 49/70* (2013.01); *H04L 67/10* (2013.01)

(58) Field of Classification Search
CPC ....... H04L 41/046; H04L 49/70; H04L 41/22; H04L 47/24; H04L 45/02; H04L 43/028; H04L 43/12; H04L 43/062; H04L 41/12; H04L 67/10; H04L 12/4633
USPC ........................................................ 370/389
See application file for complete search history.

(56) References Cited

U.S. PATENT DOCUMENTS

| | | | |
|---|---|---|---|
| 6,167,445 A * | 12/2000 | Gai | ...................... H04L 41/0893 709/220 |
| 7,680,100 B1 | 3/2010 | Corliss et al. | |
| 9,037,571 B1 | 5/2015 | Baranowski et al. | |
| 9,672,189 B2 | 6/2017 | Raz et al. | |
| 9,906,401 B1 | 2/2018 | Rao | |
| 10,177,963 B2 | 1/2019 | Rao | |
| 2003/0130821 A1 | 7/2003 | Anslow et al. | |

(Continued)

OTHER PUBLICATIONS

Final Office Action dated Aug. 18, 2017, for U.S. Appl. No. 15/433,864 of Rao filed Feb. 15, 2017.

(Continued)

*Primary Examiner* — Hassan A Phillips
*Assistant Examiner* — Mohammed S Chowdhury
(74) *Attorney, Agent, or Firm* — Perkins Coie LLP

(57) ABSTRACT

Disclosed is a technique for providing packet filter maps with high branching factors in a system for managing network traffic in a visibility fabric. A high branching factor enables a map to branch out more than two ways. High branching factors can be realized by allowing a map to be affiliated with more than one action set. For example, each rule of the map may be affiliated with a unique action set that is executed only when the corresponding rule is satisfied.

22 Claims, 12 Drawing Sheets

(56) References Cited

U.S. PATENT DOCUMENTS

| | | |
|---|---|---|
| 2004/0148376 A1 | 7/2004 | Rangan et al. |
| 2006/0126645 A1 | 6/2006 | Devarapalli et al. |
| 2007/0266370 A1* | 11/2007 | Myers .............. G06F 9/45504 717/119 |
| 2008/0137591 A1* | 6/2008 | Hirano ................ H04L 63/18 370/328 |
| 2008/0301394 A1 | 12/2008 | Muppirala et al. |
| 2011/0310899 A1* | 12/2011 | Alkhatib ......... H04L 29/12047 370/392 |
| 2011/0318011 A1 | 12/2011 | Brassil |
| 2012/0047096 A1 | 2/2012 | Duffield et al. |
| 2012/0233668 A1* | 9/2012 | Leafe ............... G06F 9/44526 726/4 |
| 2013/0125124 A1 | 5/2013 | Kempf et al. |
| 2014/0188701 A1* | 7/2014 | Sreedhararaj ........ G06Q 20/32 705/39 |
| 2014/0244851 A1* | 8/2014 | Lee .................. H04L 12/4641 709/228 |
| 2015/0009828 A1* | 1/2015 | Murakami ............ H04L 47/20 370/235 |
| 2015/0040228 A1 | 2/2015 | Lee et al. |
| 2015/0074258 A1* | 3/2015 | Ferreira ............ H04L 43/0876 709/224 |
| 2015/0128245 A1* | 5/2015 | Brown ............... H04L 47/323 726/12 |
| 2015/0229656 A1 | 8/2015 | Shieh |
| 2015/0244716 A1 | 8/2015 | Potlapally et al. |
| 2015/0295758 A1* | 10/2015 | Melander ........... H04L 12/4633 370/254 |
| 2015/0295779 A1 | 10/2015 | Ching et al. |
| 2015/0370596 A1 | 12/2015 | Fahs et al. |
| 2016/0105471 A1* | 4/2016 | Nunes ............... H04L 12/4633 709/228 |
| 2016/0182336 A1* | 6/2016 | Doctor .................. H04L 43/12 709/224 |
| 2016/0226944 A1 | 8/2016 | Hsiao et al. |
| 2016/0357587 A1 | 12/2016 | Yadav et al. |
| 2016/0359697 A1 | 12/2016 | Scheib et al. |
| 2016/0359872 A1 | 12/2016 | Yadav et al. |
| 2017/0026283 A1* | 1/2017 | Williams ............. H04L 45/74 |
| 2017/0034010 A1* | 2/2017 | Fong .................. H04L 41/20 |
| 2017/0063886 A1 | 3/2017 | Muddu et al. |
| 2017/0078426 A1* | 3/2017 | Dickens ............... H04L 67/26 |
| 2017/0085447 A1 | 3/2017 | Chen et al. |
| 2017/0099195 A1* | 4/2017 | Raney ............... H04L 12/4633 |
| 2017/0171158 A1* | 6/2017 | Hoy ................... H04L 63/0272 |
| 2017/0180421 A1 | 6/2017 | Shieh et al. |
| 2017/0279687 A1 | 9/2017 | Muntés-Mulero et al. |
| 2017/0279690 A1* | 9/2017 | Tripathi .............. H04L 47/783 |
| 2017/0366395 A1* | 12/2017 | Goldfarb ........... H04L 12/4641 |
| 2018/0027006 A1 | 1/2018 | Zimmermann et al. |
| 2018/0063193 A1* | 3/2018 | Chandrashekhar ........................ G06F 9/45533 |
| 2018/0089278 A1 | 3/2018 | Bhattacharjee et al. |
| 2018/0091392 A1 | 3/2018 | Richards et al. |
| 2018/0102953 A1* | 4/2018 | Mahindru ............. G06F 9/5094 |
| 2018/0102985 A1* | 4/2018 | Byers .................... H04L 47/80 |

OTHER PUBLICATIONS

Non Final Office Action, dated May 11, 2017, for U.S. Appl. No. 15/433,864, of A. Rao, filed Feb. 15, 2017.
Notice of Allowance dated Dec. 21, 2017, for U.S. Appl. No. 15/433,864 of Rao, A. filed Feb. 15, 2017.
U.S. Appl. No. 15/805,460 of Rao, A. filed Nov. 7, 2017.
U.S. Appl. No. 15/805,505 of Rao, A. filed Nov. 7, 2017.
U.S. Patent Application No. 15/815,487 of Rao, A. filed Nov. 7, 2017.
U.S. Appl. No. 15/885,534 of Rao, A. filed Jan. 31, 2018.
Non Final Office Action dated May 11, 2017 for U.S. Appl. No. 15/433,864.
Final Office Action dated Aug. 18, 2017 for U.S. Appl. No. 15/433,864.
Non-Final Office Action dated May 8, 2018 of U.S. Appl. No. 15/885,534 by Rao, A., filed Jan. 31, 2018.
Notice of Allowance dated Sep. 7, 2018 of U.S. Appl. No. 15/885,534 by Rao, A., filed Jan. 31, 2018.
Non-Final Office Action dated Jan. 11, 2019 for U.S. Appl. No. 15/805,487 of Rao, Anil, filed Nov. 7, 2017, 46 pages.
U.S. Appl. No. 15/433,864 of Rao, A., filed Feb. 15, 2017.
U.S. Appl. No. 16/212,486 of Rao, A. filed Dec. 6, 2018.
U.S. Appl. No. 15/805,487 of Rao, A. filed Nov. 7, 2017.
Non-Final Office Action dated Jul. 17, 2019 for U.S. Appl. No. 15/805,460 of Anil Rao, filed Nov. 7, 2017, 25 pages.
Final Office Action dated Jul. 5, 2019 for U.S. Appl. No. 15/805,487 of Anil Rao, filed Nov. 7, 2017, 41 pages.
Final Office Action dated Nov. 7, 2019 for U.S. Appl. No. 15/805,460 of Anil Rao, filed Nov. 7, 2017, 17 pages.
Non-Final Office Action dated Jan. 23, 2020, for U.S. Appl. No. 15/805,487, filed Nov. 7, 2017; 38 pages.
Non-Final Office Action dated Mar. 9, 2020, for U.S. Appl. No. 15/805,460, filed Nov. 7, 2017; 24 pages.
Non-Final Office Action dated Dec. 11, 2019 for U.S. Appl. No. 15/815,524 of Anil Rao, filed Nov. 16, 2017, 47 pages.
Final Office Action dated May 31, 2019 for U.S. Appl. No. 15/815,524, filed Nov. 16, 2017; 43 pages.
Advisory Action for U.S. Appl. No. 15/805,460 dated Feb. 7, 2020; 4 pages.
Non-Final Office Action dated Mar. 27, 2020, for U.S. Appl. No. 15/805,505, filed Nov. 7, 2017, 34 pages, 34 pages.
Non Final Office Action dated Apr. 10, 2020 for U.S. Appl. No. 16/212,486; 33 pages, dated Apr. 10, 2020.
Notice of Allowance dated Jun. 18, 2020 for U.S. Appl. No. 16/212,486 of Anil Rao; 15 pages., dated Jun. 18, 2020.
Notice of Allowance dated Jul. 1, 2020 for U.S. Appl. No. 15/805,505, filed Nov. 7, 2017, 21 pages, dated Jul. 1, 2020.
Notice of Allowance dated Oct. 23, 2020 for U.S. Appl. No. 16/598,416, filed Oct. 10, 2019, 28 pages., dated Oct. 23, 2020.
Notice of Allowance dated Nov. 5, 2020 for U.S. Appl. No. 15/805,487, filed Nov. 6, 2017, 22 pages., dated Nov. 5, 2020.

* cited by examiner

… …

MAPS HAVING A HIGH BRANCHING FACTOR

CROSS-REFERENCE TO RELATED APPLICATIONS

This application claims the benefit of U.S. Provisional Patent Application No. 62/425,577, titled "Programmable Network Switches for Cloud Computing Architectures" and filed on Nov. 22, 2016, which is incorporated by reference herein in its entirety.

FIELD OF THE INVENTION

At least one embodiment of the present disclosure pertains to techniques for managing traffic traversing a computer network and, more particularly, to techniques for providing maps capable of handling the data packets that form the traffic.

BACKGROUND

Traffic in a computer network can be analyzed to improve real-time decision making for network operations, security techniques, etc. Traffic may be acquired at numerous points by a variety of devices/applications (collectively referred to as "nodes" in the computer network), and then forwarded to a network visibility appliance able to provide extensive visibility of traffic flow. Given the complexity and volume of traffic routed through many infrastructures, various kinds of network tools are often used to identify, analyze, or handle issues plaguing the computer network. These issues can include security threats, bottlenecks, etc. Examples of such network tools include an intrusion detection system (IDS) and an intrusion prevention system (IPS).

Network visibility appliances and network tools can operate as in-band devices (also referred to as "inline devices") or out-of-band devices. Out-of-band devices operate outside of the path of traffic between an origination node and a destination node, and thus receive copies of the data packets that make up the traffic rather than the original data packets. Out-of-band devices can freely modify the copies of the data packets because the original data packets are allowed to traverse the computer network unimpeded. Inline devices, on the other hand, operate within the path of traffic between an origination node and a destination node, and thus receive the original data packets.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1A:
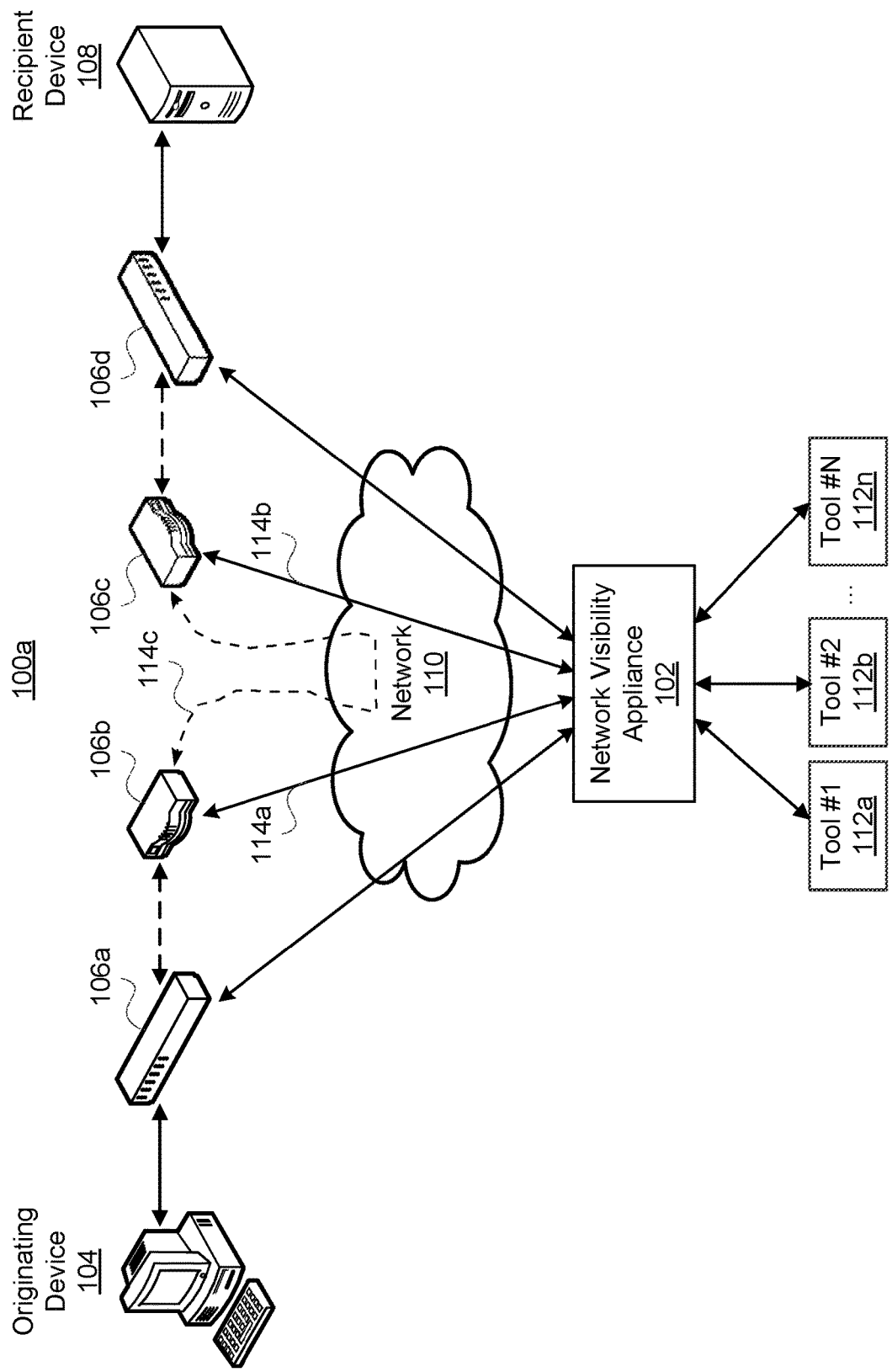
FIG. 1A depicts an example of a network arrangement in which a network visibility appliance receives data packets from multiple devices/applications (collectively referred to as "nodes") in a computer network.

A network visibility appliance can be configured to receive data packets from one or more other nodes within a computer network. The network visibility appliance will often be coupled to one or more network tools configured to analyze the data packets (or copies of the data packets), monitor the traffic within the computer network, or block the transmission of abnormal (e.g., malicious) data packets.

Network visibility appliances have traditionally managed traffic using legacy maps. A legacy map is a static data structure that represents a detailed traffic distribution policy for how incoming data packets are to be handled by a network visibility appliance.

Legacy maps serve several purposes. First, a legacy map can include a rule that indicates whether an incoming data packet is to be altered in some way. For example, the rule may indicate that a data packet is to be aggregated with another data packet, filtered, or modified (e.g., stripped of a header or payload). Second, a legacy map can include a routing instruction that indicates where an incoming data packet is to be forwarded. For example, the routing instruction may indicate that a data packet received at a specified ingress port should be forwarded to a specified egress port. Thus, legacy maps ensure that traffic matching certain criteria is properly forwarded downstream (e.g., to a network tool or another network visibility appliance).

Legacy maps suffer from several drawbacks, however. For example, with exponential growth in workloads within physical data centers, many end users (e.g., individuals and enterprises) have begun moving work processes and data to cloud computing platforms. However, because legacy maps are static data structures, they cannot be dynamically edited. As such, legacy maps are often unsuitable for filtering traffic traversing cloud computing infrastructures that constantly change over time.

Introduced here, therefore, are maps that can be bound to source object(s) and destination object(s) upon deployment within a network visibility appliance. More specifically, a controller can associate a map with a source object and a destination object before the map is implemented (i.e., used)

by the network visibility appliance. Binding may require that the controller dynamically edit an action set associated with a data structure (e.g., a programmable flow table) corresponding to the map. The data structure is accessible to the network visibility appliance, which can use the data structure to route traffic. For example, the data structure may be stored in a ternary content-addressable memory (TCAM).

Moreover, legacy maps branch out in exactly two ways. If a legacy map determines that a data packet satisfies a rule, then the legacy map can allow the data packet to pass (also referred to as an "accept action"). However, if the legacy map determines that the data packet does not satisfy the rule, then the legacy map can prevent the data packet from passing (also referred to as a "drop action").

In contrast, the maps introduced here may have high branching factors that allow traffic traversing a visibility fabric to be readily managed. In some embodiments the network visibility appliance acts as the visibility fabric, while in other embodiments the network visibility appliance is a part of the visibility fabric. A high branching factor enables a map to branch out in more than two ways. High branching factors can be realized by allowing a map to be affiliated with more than one action set. For example, each rule of a map may be affiliated with a unique action set that is executed only when the corresponding rule is satisfied.

Terminology

Reference to "one embodiment" or "an embodiment" means that the particular feature, function, structure, or characteristic being described is included in at least one embodiment of the present disclosure. Occurrences of such phrases do not necessarily all refer to the same embodiment, nor are they necessarily referring to alternative embodiments that are mutually exclusive of one another.

The terms "connected," "coupled," or any variant thereof includes any connection or coupling between two or more elements, either direct or indirect. The coupling/connection can be physical, logical, or a combination thereof. For example, two devices may be physically, electrically, and/or communicatively coupled to one another.

Visibility Appliance Architecture

FIG. 1A depicts an example of a network arrangement 100a in which a network visibility appliance 102 receives data packets from multiple devices/applications (collectively referred to as "nodes") in a computer network 110. The nodes couple an originating device 104 (e.g., a desktop computer system) to a recipient device 108 (e.g., a server). Thus, the nodes allow data packets to be transmitted between the originating device 104 and the recipient device 108. Examples of nodes include switches (e.g., switches 106a, 106d), routers (e.g., routers 106b, 106c), network taps, etc.

Each node represents an entry point into the computer network 110. The entry points could be, and often are, from different points within the computer network 110. Generally, at least some of the nodes are operable to transmit data packets received as network traffic (or duplicate copies of the data packets) to a network visibility appliance 102 for analysis. Network traffic can be directed to the network visibility appliance 102 by a node that provides an entry point into the computer network 110.

Whether a node transmits the original data packets or copies of the original data packets to a device downstream of the node (e.g., the network visibility appliance 102) depends on whether the downstream device is an inline device or an out-of-band device. As noted above, inline devices receive the original data packets, while out-of-band devices receive copies of the original data packets.

Here, the network visibility appliance 102 can receive data packets from node 106b (e.g., via transmission path 114a) and pass at least some of the data packets to node 106c (e.g., via transmission path 114b). Because node 106b is able to transmit network traffic downstream through the network visibility appliance 102, node 106b need not be coupled directly to node 106c (i.e., transmission path 114c may not exist). Some or all of the nodes within the computer network 110 can be configured in a similar fashion.

When the network visibility appliance 102 is deployed as an inline device, data packets are received by the network visibility appliance 102 at a network port (referred to as an "ingress port"). For example, data packets transmitted by node 106b via transmission path 114a are received by the network visibility appliance 102 at a particular ingress port. The network visibility appliance 102 may include multiple network ports coupled to different nodes in the computer network 110. The network visibility appliance 102 can be, for example, a monitoring platform that includes a chasses and interchangeable blades offering various functionalities, such as enhanced packet distribution and masking/filtering capabilities.

The network visibility appliance 102 can also transmit data packets from a network port (referred to as an "egress port"). For example, the network visibility appliance may include multiple egress ports that are coupled to different network tools 112a-n. Each network tool 112a-n can be deployed as an inline device or an out-of-band device at any given point in time. When a network tool is deployed as an out-of-band device, the network visibility appliance 102 creates a duplicate copy of at least some of the data packets received by the network visibility appliance 102, and then passes the duplicate copies to an egress port for transmission downstream to the out-of-band network tool. When a network tool is deployed as an inline device, the network visibility appliance 102 passes at least some of the original data packets to an egress port for transmission downstream to the inline network tool, and those data packets are then normally received back from the tool at a separate network port of the network visibility appliance 102 (assuming the data packets are not blocked by the tool).

Figure 1B:
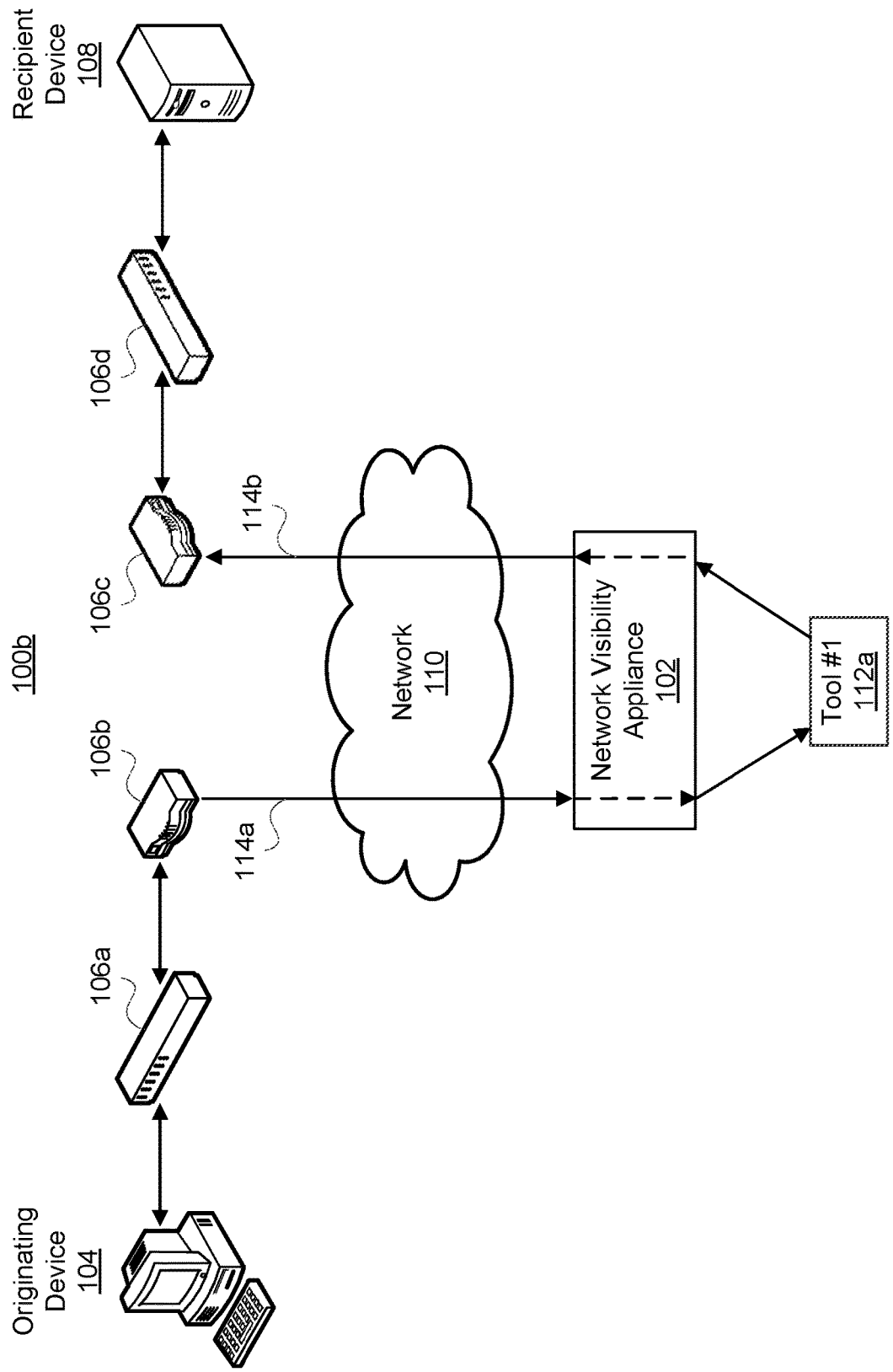
FIG. 1B illustrates an example path of a data packet as the data packet travels from an originating device to a recipient device.

FIG. 1B illustrates an example path of a data packet as the data packet travels from an originating device 104 to a recipient device 108. More specifically, FIG. 1B depicts a network arrangement 100b in which the network visibility appliance 102 and a network tool 112a are both deployed as inline devices (i.e., within the flow of network traffic). Although the transmission paths connecting the network visibility appliance 102 and network tool 112a are half duplex wires (i.e., only transmit information in one direction), full duplex wires capable of transmitting information in both directions could also be used for some or all of the transmission paths between nodes of the computer network 110.

After receiving a data packet from node 106b, the network visibility appliance 102 identifies a map corresponding to the data packet based on one or more characteristics of the data packet. For example, the characteristic(s) could include the communication protocol of which the data packet is a part (e.g., HTTP, TCP, IP) or a session feature (e.g., a timestamp). Additionally or alternatively, the proper map could be identified based on the network port of the network visibility appliance 102 at which the data packet was received, the source node from which the data packet was received, etc.

As further described below, the map represents a policy for how the data packet is to be handled by the network visibility appliance 102. For example, the map could specify that the data packet is to be transmitted in a one-to-one configuration (i.e., from an ingress port of the network visibility appliance 102 to an egress port of the network visibility appliance 102), a one-to-many configuration (i.e., from an ingress port of the network visibility appliance 102 to multiple egress ports of the network visibility appliance 102), or a many-to-one configuration (i.e., from multiple ingress ports of the network visibility appliance 102 to an egress port of the network visibility appliance 102). Thus, a single egress port of the network appliance 102 could receive data packets from one or more ingress ports of the network appliance 102.

Often, the data packet is passed (e.g., by a processor of the network visibility appliance 102) to an egress port for transmission downstream to a network tool (e.g., a monitoring and/or security tool). Here, for example, the map may specify that the data packet is to be passed by the network visibility appliance 102 to a tool port for transmission downstream to network tool 112a. The network visibility appliance 102 may aggregate or modify the data packet in accordance with the policy specified by the map before passing the data packet to the egress port for transmission downstream to the network tool 112a. In some embodiments, the network visibility appliance 102 includes multiple egress ports, each of which is coupled to a different network tool or another network visibility appliance.

After analyzing the data packet, the network tool 112a normally transmits the data packet back to the network visibility appliance 102 (i.e., assuming the network tool 112a does not determine that the packet should be blocked), which passes the data packet to a network port for transmission downstream to another node (e.g., node 106c).

Figure 2:
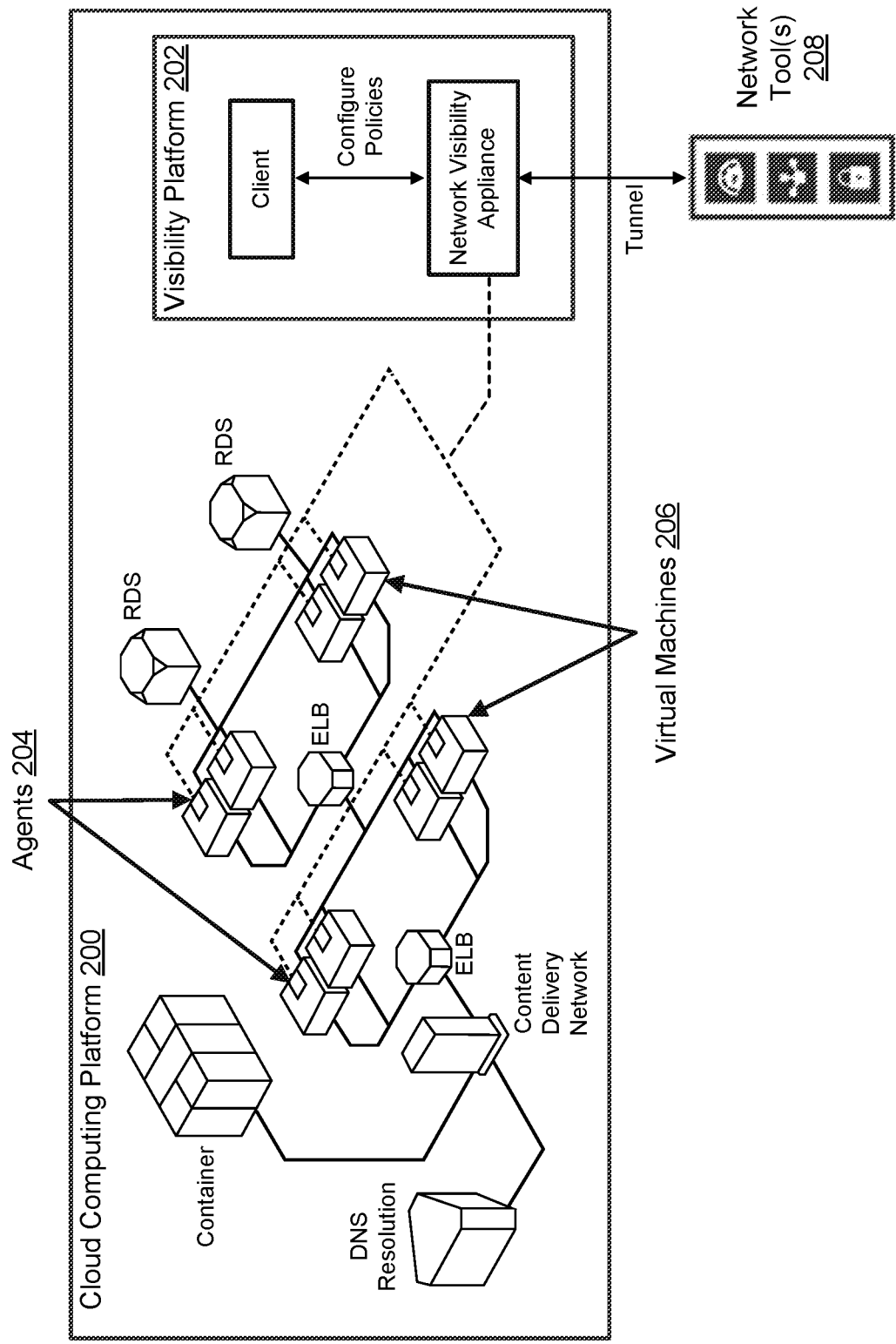
FIG. 2 depicts an example of how a visibility platform can be integrated into a cloud computing platform to provide a coherent view of virtualized traffic in motion across the public cloud infrastructure for an end user.

FIG. 2 depicts an example of how a visibility platform 202 can be integrated into a cloud computing platform 200 to provide a coherent view of virtualized traffic in motion across the public cloud infrastructure for an end user. Many end users have begun moving work processes and data to cloud computing platforms. By installing agents 204 on some or all of the virtual machines 206 belonging to the end user, the visibility platform 202 can acquire data packets (or duplicate copies of the data packets) traversing a public cloud infrastructure for further analysis in order to improve visibility into possible security risks.

In some embodiments, the visibility platform 202 is communicatively coupled to one or more network tools 208 for analyzing the virtualized traffic. The network tool(s) 208 can be hosted locally as part of the visibility platform 202 (i.e., on the cloud computing platform 200) or remotely (e.g., within an on-premises computing environment controlled by the end user). When the visibility platform 202 is entirely virtual, the visibility platform 202 establishes a tunnel for delivering the virtualized traffic to the network tool(s) 208 regardless of where the network tool(s) 208 reside. However, when the visibility platform 202 is physical (e.g., the network visibility appliance is comprised of a physical programmable switch), the visibility platform 202 may establish a tunnel only for those network tool(s) 208 that are hosted remotely (e.g., are not directly coupled to the visibility platform 202 using physical cables).

A "tunnel" is a mechanism that can be used to reliably transmit virtualized traffic across a network. Before virtualized traffic is forwarded to the tunnel by the visibility platform 202 for transmission to the network tool(s) 208, the visibility platform 202 may create an outer jacket for the virtualized traffic (and any other network content) based on the type of tunnel. For example, an inner payload could be wrapped in an encapsulation by the visibility platform 202 in accordance with a Virtual Extensible LAN (VXLAN) protocol or a Generic Routing Encapsulation (GRE) protocol. The network tool(s) 208 can then remove the outer jacket upon reception and determine how the inner payload (i.e., the actual virtualized traffic) should be handled.

The visibility platform 202 can exist as a cloud-native virtual machine (also referred to as an "unnative virtual machine") that analyzes virtualized traffic traversing the cloud computing platform 200. Accordingly, the visibility platform 202 may not be limited by the computer hardware responsible for supporting the cloud computing platform 200.

Figure 3:
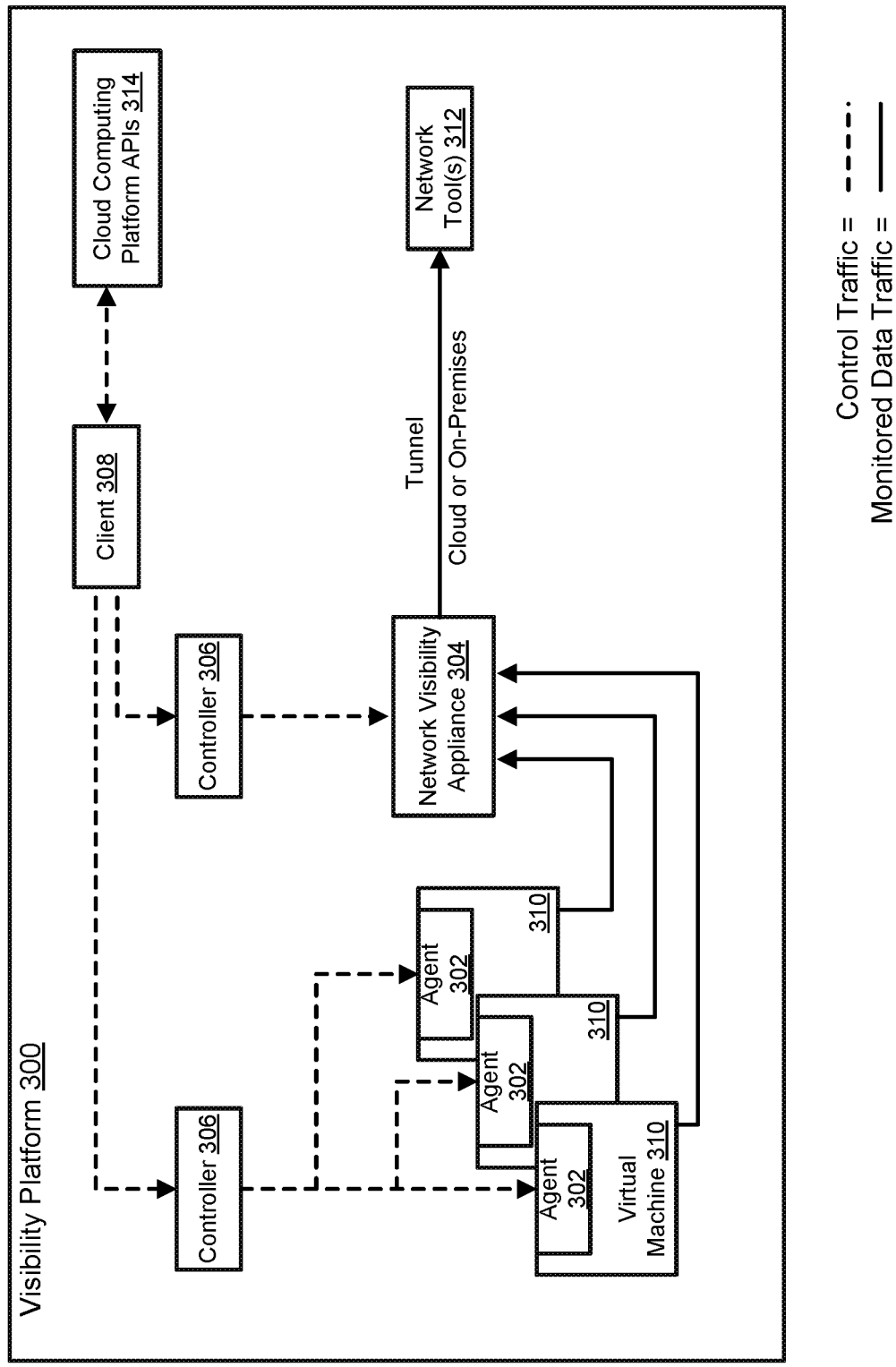
FIG. 3 depicts one embodiment of a visibility platform that can be run entirely within a cloud environment or a non-cloud environment (e.g., as a virtual machine).

FIG. 3 depicts one embodiment of a visibility platform 300 that can be run entirely within a cloud environment or a non-cloud environment (e.g., as a virtual machine). Thus, the visibility platform 300 may be hosted on a cloud computing platform, run on a dedicated piece of computer hardware (e.g., a monitoring platform that includes a chassis and interchangeable blades offering various functionalities, such as enhanced packet distribution and masking/filtering capabilities), or some combination thereof. For example, the visibility platform 300 could include a network visibility appliance 304 that resides on a stand-alone personal computer, a dedicated network server, or some other computing device having an x86 instruction set architecture.

In some instances it may be desirable to run the network visibility appliance 304 as a virtual machine on a cloud computing platform (e.g., cloud computing platform 200 of FIG. 2). For example, the visibility platform 300 may exist inside of a Virtual Private Cloud (VPC) that resides within a dedicated section of an end user's virtual network within Amazon Web Services (AWS), VMware, OpenStack, etc. Such an arrangement permits the visibility platform 300 to intelligently optimize, filter, and analyze virtualized traffic across hundreds or thousands of virtual machines. Note, however, that the visibility platform 300 may also exist outside of the VPC.

The visibility platform 300 can include one or more agents 302 for mirroring virtualized traffic traversing a cloud computing platform, a network visibility appliance 304 for aggregating and filtering the virtualized traffic, one or more controllers 306, and a client 308 for managing the visibility platform 300 as a whole. Other embodiments may include a subset of these components.

As shown here, each agent 302 is fully contained within a corresponding target virtual machine 310 whose virtualized traffic is to be monitored. While the agent(s) 302 serve requests issued by the controller(s) 306, each agent 302 may be responsible for configuring its own interface mirrors, tunnels, etc.

The network visibility appliance 304 can include a programmable switch (also referred to as a "switching engine"). The programmable switch may be a physical switch or a virtual switch, such as a software-defined networking (SDN) switch. The network visibility appliance 304 is responsible for aggregating virtualized traffic mirrored by the agent(s) 302, and then forwarding at least some of the aggregated virtualized traffic to one or more network tools 312 for further analysis. In some embodiments, the network visibility appliance 304 filters (e.g., slices, masks, or samples) and/or replicates the aggregated virtualized traffic before forwarding it downstream to the network tool(s) 312.

The controller(s) 306, meanwhile, may be controllable by the end user via the client 308, which may be hosted on the cloud computing platform on in an on-premises computing environment controlled by the end user. In some embodiments a single controller 306 is configured to control the agent(s) 302 and the programmable switch 304, while in other embodiments multiple controllers 306 are configured to control the agent(s) 302 and the network visibility appliance 304. Here, for example, a first controller controls the agent(s) 302 and a second controller controls the network visibility appliance 304. However, each agent 302 could also be associated with a dedicated controller.

Together, the client 308 and the controller(s) 306 enable centralized management of the visibility platform 300 as a whole. For example, the client 308 may be configured to integrate with one or more application programming interfaces (APIs) 314 offered by the cloud computing platform in order to retrieve relevant information about the virtualized traffic being monitored (e.g., end user credentials, virtual machine addresses, virtualized traffic characteristics). In some embodiments, the client 308 supports a drag-and-drop user interface that can be used by the end user to create and implement traffic policies. Moreover, the client 308 may provide traffic policy statistics to the end user or an administrator (e.g., the manager of the visibility platform 300) for troubleshooting in real time.

By identifying the network object(s) interconnected through a visibility fabric, a traffic flow can be readily monitored regardless of whether the network visibility appliance is monitoring data packets traversing a physical device or a virtual environment. Examples of network objects include raw endpoints, tunnel endpoints, application endpoints, and maps. A network visibility appliance may include one or more raw endpoints that receive traffic direction from corresponding Network Interface Cards (NICs) or virtual Network Interface Cards (vNICs). The network visibility appliance may also include one or more tunnel endpoints that send/receive traffic to/from remote locations. Examples of remote locations include other network visibility appliances, on-premises computing environments, etc. Tunnel endpoints can be created by the network visibility appliance using APIs, and tunnel endpoints are typically associated with both a remote endpoint and a specific type (e.g., VXLAN or GRE).

The network visibility appliance may also include one or more application endpoints that send/receive packets to/from application programs (also referred to as "applications"). Applications may be responsible for creating, aggregating, filtering, and/or modifying the virtualized traffic received by the network visibility appliance. Examples of applications can include masking programs, deep packet inspection programs, net flow generation programs, etc.

The network visibility appliance can receive traffic at raw endpoints, tunnel endpoints, and application endpoints, and the network visibility appliance can output traffic at tunnel endpoints and application endpoints. Raw endpoints, therefore, can only receive incoming traffic, while tunnel endpoints and application endpoints are generally bi-directional (i.e., can receive and transmit traffic across different ingress and egress interfaces).

Raw endpoints can receive traffic directly from (v)NICs. However, tunnel endpoints are often the predominant way to route traffic away from a network visibility appliance (e.g., into an on-premises environment that includes one or more network tools). Moreover, although application endpoints route virtualized traffic into an environment managed by an application, the environment still typically resides within the network visibility appliance.

Maps Usable by Network Visibility Appliances

A network visibility appliance can be configured to filter traffic received at an ingress port. More specifically, the network visibility appliance may select traffic of interest by matching received traffic against specified criteria defined in a map. For example, traffic satisfying a first criterion can be routed to a first destination, and traffic satisfying a second criterion can be routed to a second destination. Each destination may correspond to a different egress port coupled to a network tool or another network visibility appliance.

Figure 4:
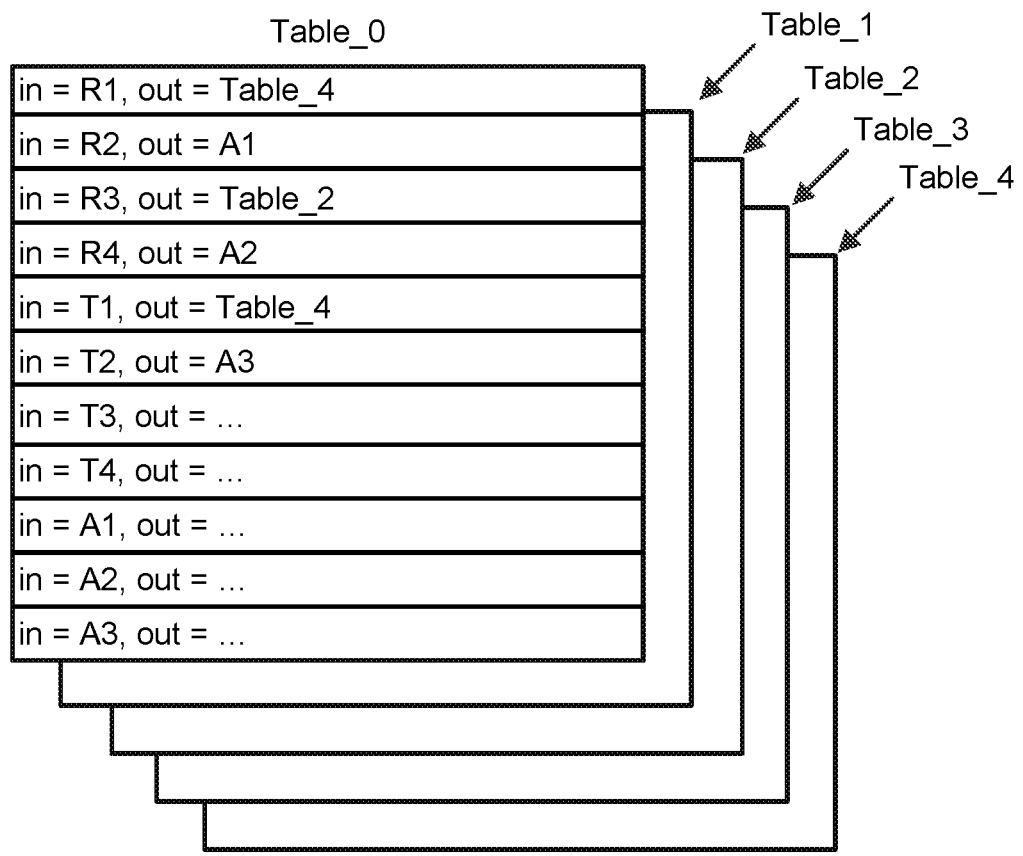
FIG. 4 depicts an example of a series of programmable flow tables that can be used by a network visibility appliance (and, more specifically, a programmable switch) to route traffic.

FIG. 4 depicts an example of a series of programmable flow tables that can be used by a network visibility appliance (and, more specifically, a programmable switch) to route traffic. Each network object capable of receiving incoming traffic (i.e., each raw endpoint, tunnel endpoint, and application endpoint) can be represented by a row in Table_0. These network objects can be referred to as possible "ingress ports," "ingress interfaces," or "ingress points." Table_0 is responsible for initially routing all incoming traffic to a tunnel endpoint, an application endpoint, or a map (which requires the corresponding entry list another table). In some embodiments, the network visibility appliance maintains statistics regarding how traffic is routed between the various network objects.

Figure 5:
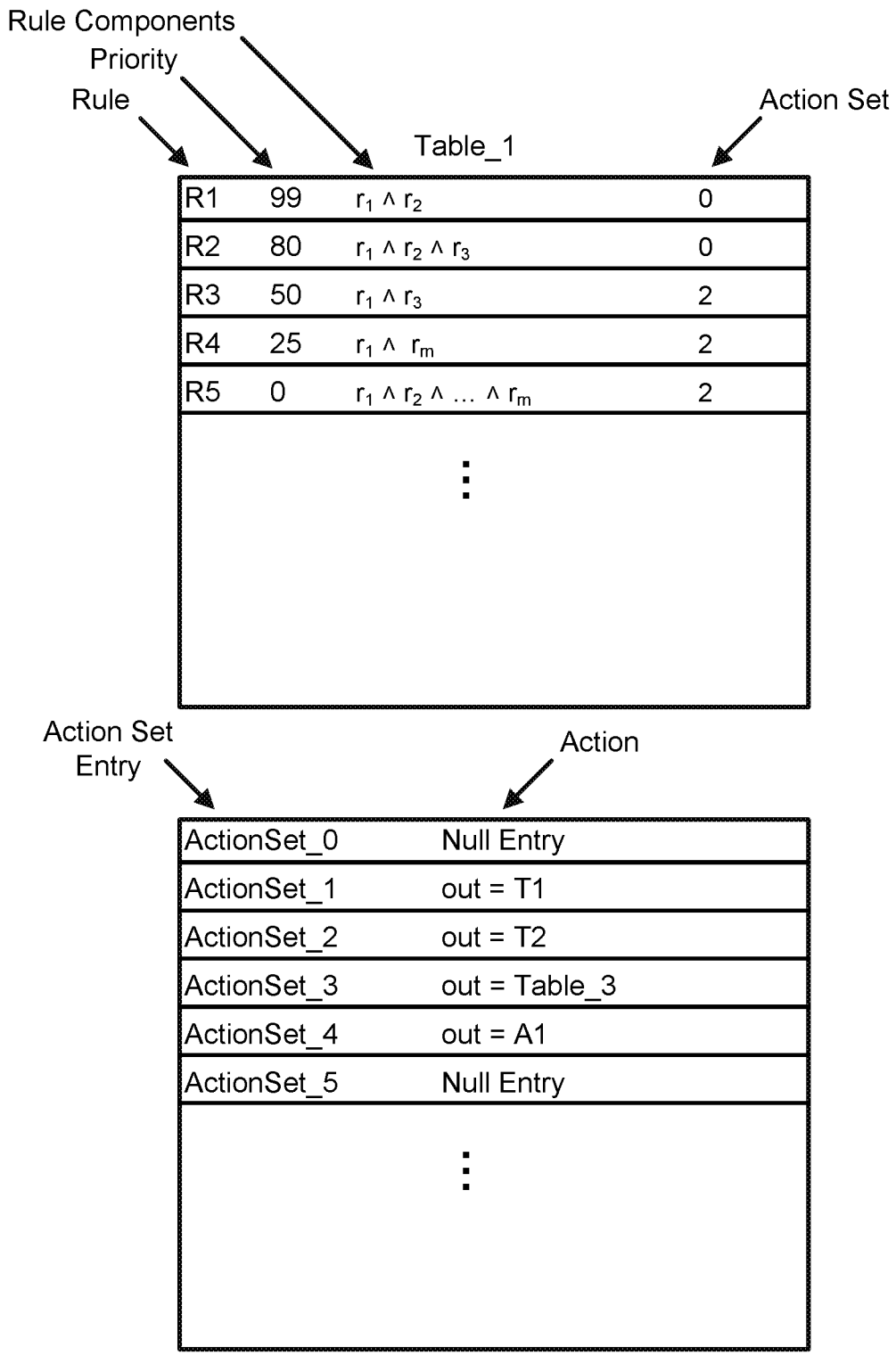
FIG. 5 depicts an example of a programmable flow table for a map.

Each map is represented by its own table (e.g., Table_1, Table_2, Table_3, and Table_4). FIG. 5 depicts an example of a programmable flow table for a map. The number of lines in the programmable flow table (which is generally on the order of hundreds or thousands) defines how many rules are allowed in the map.

Maps represent packet filters that can be applied to data packets. A map (M) is a collection of one or more rules that is considered a "match" if any of the rules has a match.

$$M = R_1 \lor R_2 \ldots \lor R_n$$

A rule (R) includes one or more rule components that must be simultaneously satisfied.

$$R = r_1 \land r_2 \land \ldots \land r_m$$

A rule component (r) is a specific filtering criterion for matching packets (e.g., based on address, protocol, source port, destination port, or some other packet criteria).

As shown in FIG. 5, the programmable flow table can specify what will happen if any of the rules (e.g., R1, R2, R3, R4, or R5) result in a match. The outcome (also referred to as an "action set") may specify, for example, that matching data packets should be dropped or routed to a specific network object (e.g., a tunnel endpoint, an application endpoint, or another map).

FIG. 5 also depicts an example of a programmable flow table that includes the action sets for a map. An action set is a group of one or more actions that are applied together. Each action set can specify one or more different actions to be performed if application of a corresponding rule results in a match. If the action set is an empty set or a null set (i.e., does not include an affiliated action), then the network visibility appliance treats the action set as a conclusive drop rule. Accordingly, all matching data packets are dropped by the network visibility appliance.

The action set may list a data structure entry corresponding to a tunnel endpoint or an application endpoint. Here, for example, ActionSet_4 lists A1 (which corresponds to an application endpoint). In such instances, the network visibility appliance directs matching data packets to the specified network object, which causes the matching data packets to once again be governed by Table_0. The action set may also specify that matching data packets should be forwarded to another table corresponding to another map. Here, for example, ActionSet_3 causes traffic to be forwarded to Table_3, which represents another map. Traffic can be replicated as necessary when a data entry is associated with more than one other data entries (e.g., when the action set specifies multiple destinations).

Multiple rules may be associated with a single action set. Here, for example, rule one (R1) and rule two (R2) are affiliated with ActionSet_0, while rule three (R3), rule four (R4), and rule five (R5) are affiliated with ActionSet_2. Generally, these links to action sets are fixed once the map has been constructed and programmed into the network visibility appliance. However, because each map is assigned to its own table, an end user may be able to easily add, remove, or modify maps by adding new tables, removing existing tables, or modifying entries in existing tables.

In some embodiments, each rule is assigned a specific priority. Priorities can range from 0-99, where a larger number denotes a higher priority. Higher priority rules can then be evaluated before lower priority rules. In some embodiments no specific execution order may be guaranteed for rules having the same priority, while in other embodiments rules having the same priority are executed in the order in which they reside in the programmable flow table.

The associations described above between the various programmable flow tables are generally simple, passive links. However, the links could be made more intelligent. For example, the network visibility appliance may add quality of service (QoS) policies to certain links, stamp incoming data packets with particular metadata (e.g., a timestamp or unique identifier), modify the Internet Protocol (IP) addresses of outgoing data packets, etc.

Note that the same techniques could be implemented using a single table that is partitioned into multiple (logical) zones. For example, a first group of rows may be allocated to the network objects capable of receiving incoming traffic, a second group of rows may be allocated to a first map, and a third group of rows may be allocated to a second map.

The programmable flow tables shown in FIGS. 4-5 may be programmed (e.g., by a network visibility appliance, client, or controller) using a graph. For example, the programmable flow tables may be automatically populated responsive to determining that a graph depicting the network objects as nodes has been finalized by the end user. Links between pairs of network objects can be illustrated as connections between pairs of nodes in the graph. In some embodiments, the programmable flow tables are made accessible (i.e., exposed) to a controller that is able to dynamically add, delete, and/or modify entries in real time as the graph is altered by the end user.

Figure 6:
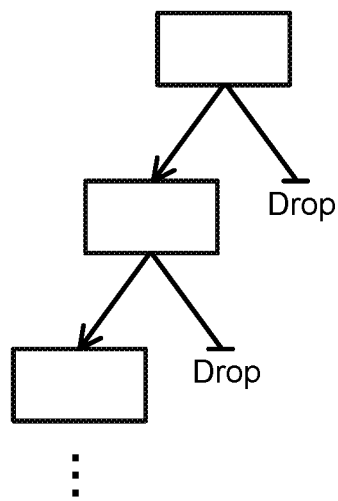
FIG. 6 depicts how the rules of a legacy map are conventionally applied sequentially.

As shown in FIG. 6, the rules of a legacy map are conventionally applied sequentially. However, such a technique causes significant delays and consumes significant processing resources when the number of entries in a data structure (e.g., a programmable flow table) representing the map exceeds a certain number (e.g., a few hundred or thousand entries).

Virtual implementation of a physical decision tree can create several different issues. For example, in order to construct an "n"-way decision tree (where n is an integer), many different maps would need to be nested together. But this also becomes a very resource-intensive operation because each branch only splits the decision one of two ways. That is, each branch only permits the outcome to be a pass action or a drop action.

The maps introduced here can address this issue by having high branching factors. A high branching factor allows a map to branch out more than two ways. Increasing the fan-out from a map can result in a much improved application time.

Figure 7:
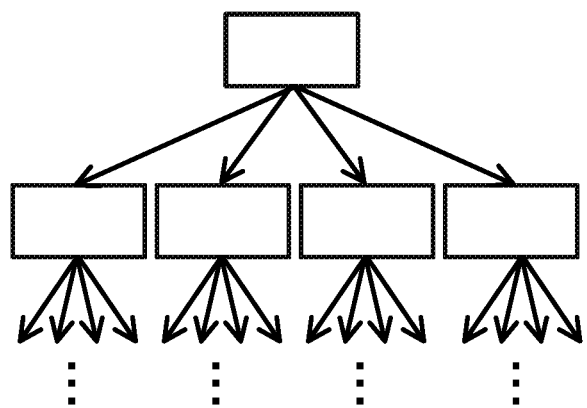
FIG. 7 depicts how a high branching factor can be realized by allowing maps to be affiliated with more than one action set.

As shown in FIG. 7, a high branching factor can be realized by allowing maps to be affiliated with more than one action set. For example, each rule may be affiliated with a particular action set that is executed only when the corresponding rule is considered a match. Thus, the branching factor (f) dictates how quickly a programmable switch can descend through the total number of rules of a map (n).

Map Descent Rate=$\log_f(n)$

For example, a programmable switch can evaluate 4,096 rules in two levels of a tree having a branching factor of 64. Note, however, that any number of paths could extend out of a given map (e.g., 10, 20, or 60).

One benefit of utilizing a cloud computing infrastructure is that a high number of nodes (e.g., network visibility appliances) may exist. Even though no single node may have much processing power, a map having a high number of rule entries can be intelligently distributed across multiple nodes, thereby taking advantage of the increased processing power. For example, a single node might only have 4 or 8 central processing units (CPUs), but the map may be distributed across 500 nodes that yield much greater collective processing capabilities.

Figure 8A:
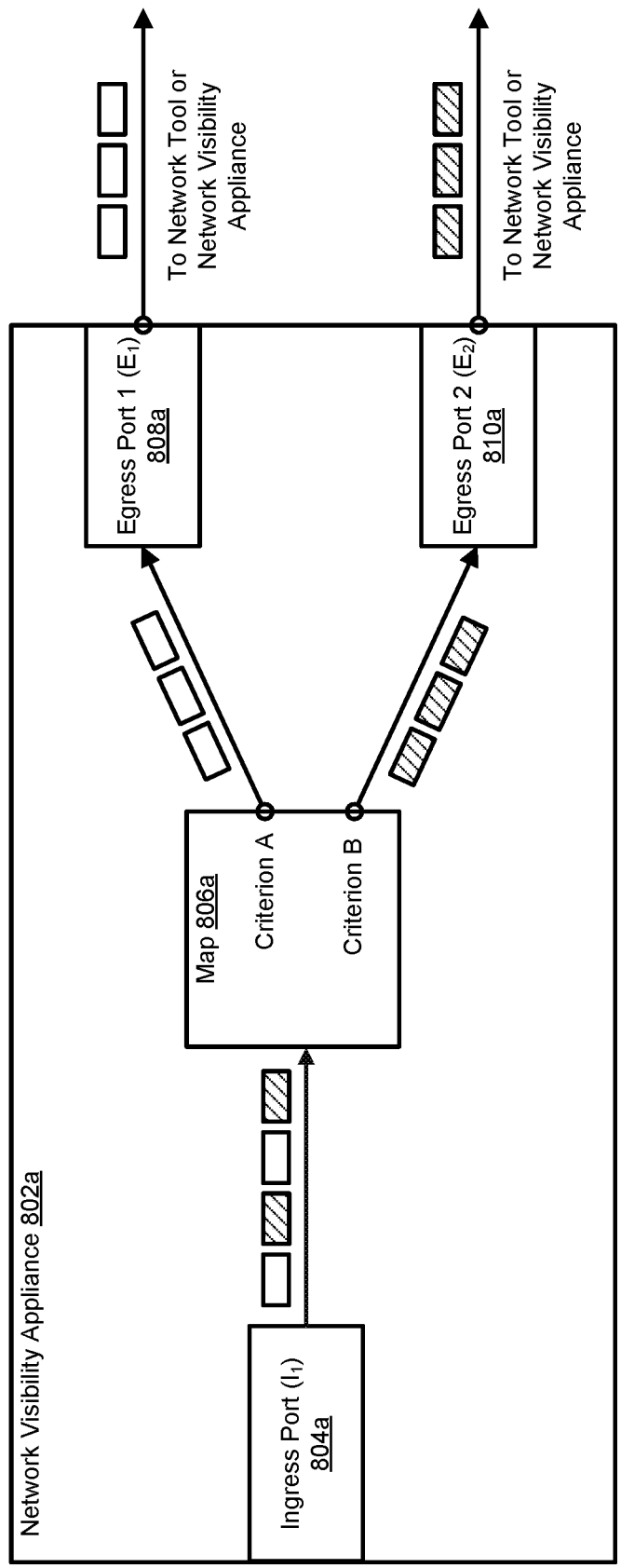
FIG. 8A depicts an example of a network visibility appliance that includes a map designed to split incoming traffic into multiple streams.

FIG. 8A depicts an example of a network visibility appliance 802a that includes a map 806a designed to split incoming traffic into multiple streams. After receiving data packets at an ingress port 804a, the network visibility appliance 802a can filter the data packets using the map 806a. Here, the map 806a includes two filtering criteria (i.e., Criterion A and Criterion B). Thus, data packets satisfying Criterion A will be filtered into one stream, and data packets satisfying Criterion B will be filtered into another stream. As noted above, data packets that do not satisfy either of the filtering criteria will be dropped. Filtering criteria may be associated with data packet characteristics, such as the communication protocol of which the data packet is a part (e.g., HTTP, TCP, UDP, IPv4), a session feature (e.g., a timestamp), the ingress port at which the data packet was received, the source node from which the data packet was received, etc.

The map 806a can also specify how data packets satisfying each filtering criterion should be handled. Here, data packets satisfying Criterion A are forwarded to egress port 808a, while data packets satisfying Criterion B are forwarded to egress port 810a. Because each filtering criterion can be associated with a separate action set, the network visibility appliance 802a can filter incoming traffic using a single map rather than a series of nested legacy maps. The egress ports 808a, 810a can be coupled to a network tool or another network visibility appliance.

Figure 8B:
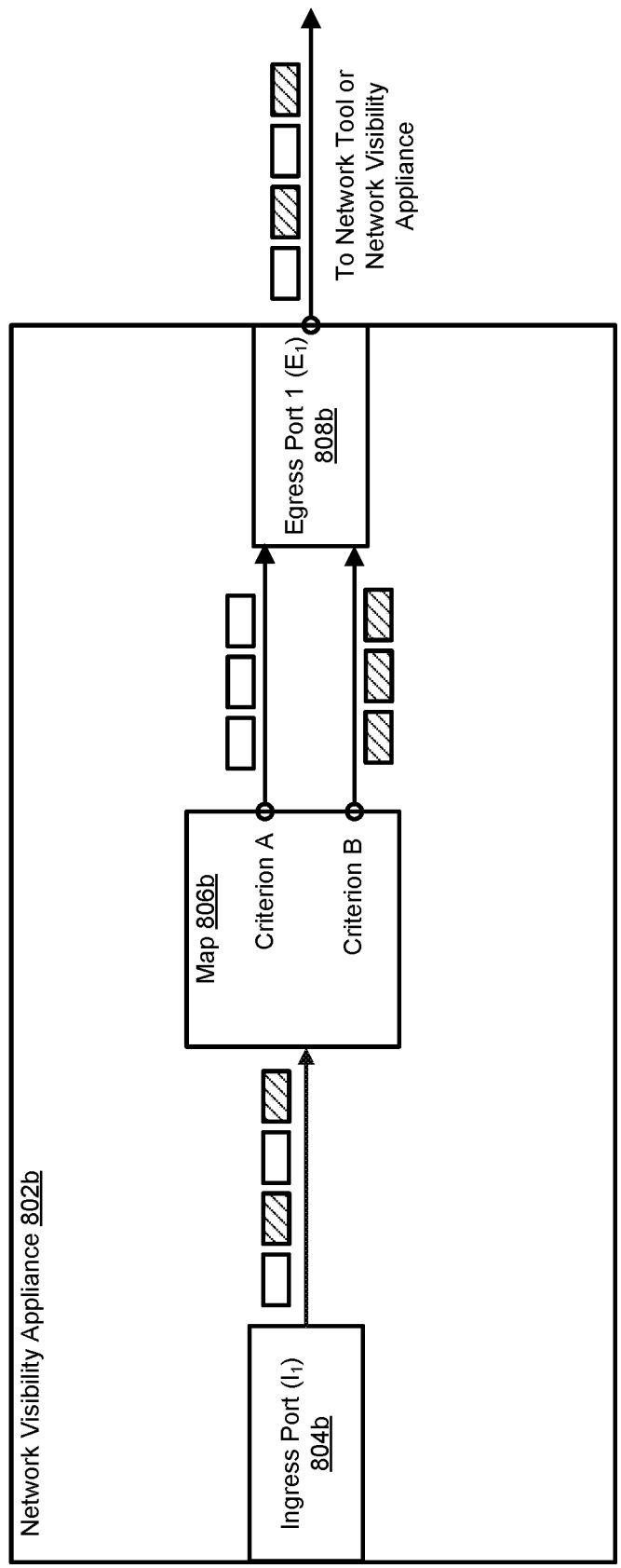
FIG. 8B depicts another example of a network visibility appliance that includes a map designed to split incoming traffic into multiple streams.

FIG. 8B depicts another example of a network visibility appliance 802b that includes a map 806b designed to split incoming traffic into multiple streams. After receiving data packets at an ingress port 804b, the network visibility appliance 802b can filter the data packets using the map 806b. Much like the map 806a of FIG. 8A, the map 806b of FIG. 8B includes two filtering criteria (i.e., Criterion A and Criterion B). Here, however, data packets satisfying Criterion A and data packets satisfying Criterion B are both forwarded to egress port 808b. Such a design can be useful in several scenarios.

For example, the network visibility appliance 802b may generate statistics on data packet matches (i.e., pass actions) even though all of the traffic may be forwarded to the egress port 808*b*. More specifically, the administrator may use map(s) to learn about the spread of traffic with respect to certain data packet characteristic(s). For instance, the map 806*b* shown here may specify the distribution of traffic between Criterion A (e.g., TCP traffic) and Criterion B (e.g., UDP traffic). Because the map 806*b* can be associated with any number of rules and action sets, detailed statistics can be generated. For example, a map could filter incoming traffic into four, six, or eight different streams.

As another example, an administrator may design the network visibility appliance 802*b* such that data packets matching different criteria are treated different. For instance, the network visibility appliance 802*b* may be configured to drop 20% of the data packets satisfying Criterion A and drop 50% of the data packets satisfying Criterion B. Such action may be useful in limiting bandwidth consumption, reducing network tool congestion, etc.

Some embodiments of the network visibility appliance include multiple ingress ports, each of which can be associated with a separate map. These maps may specify that the data packets received at the multiple ingress ports should be forwarded to a single egress port or multiple egress ports. Thus, maps can allow data packets matching a certain filtering criterion to be transmitted in a one-to-one configuration (i.e., from an ingress port of the network visibility appliance to an egress port of the network visibility appliance), a one-to-many configuration (i.e., from an ingress port of the network visibility appliance to multiple egress ports of the network visibility appliance), or a many-to-one configuration (i.e., from multiple ingress ports of the network visibility appliance to an egress port of the network visibility appliance).

Figure 9:
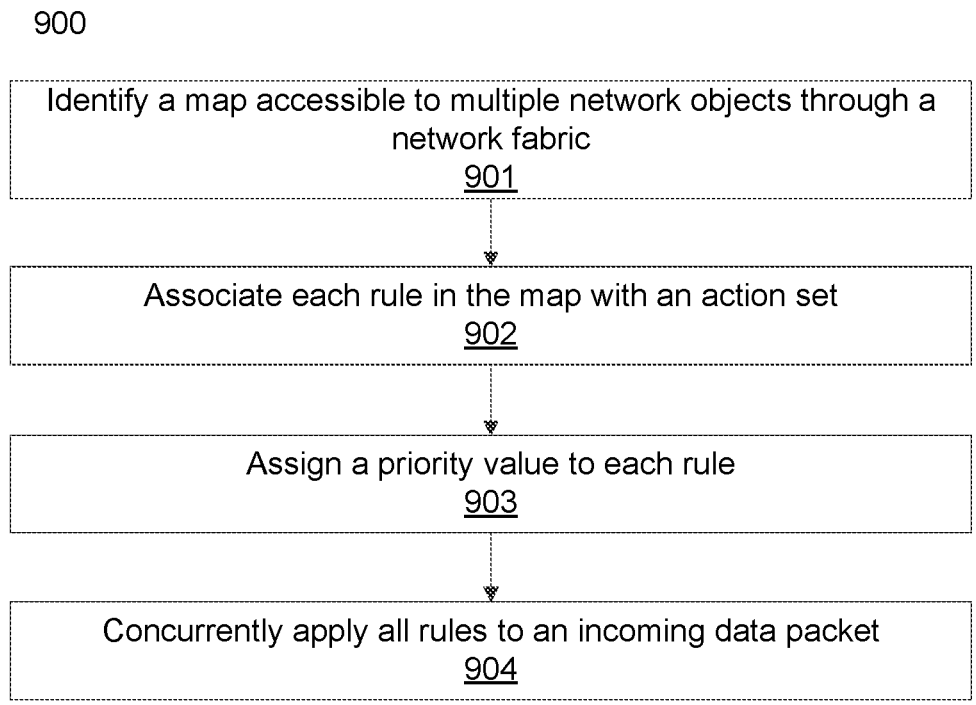
FIG. 9 depicts a process for implementing a map having a branching factor greater than two.

FIG. 9 depicts a process 900 for implementing a map having a branching factor greater than two. A map accessible to multiple network objects through a network fabric can initially be identified (step 901). Generally, the plurality of network objects will include raw endpoint(s), tunnel endpoint(s), and/or application endpoint(s).

The map includes a collection of one or more rules that are applied to data packets received by the map. Each rule can be associated with an action set that is to be executed only when a corresponding rule is considered a match (step 902). A rule is considered a match when a data packet satisfies a corresponding filtering criterion. Generally, each action set includes at least one of a pass action that causes data packets satisfying the filtering criterion to be forwarded downstream to a network object or a drop action that causes data packets that do not satisfy the filtering criterion to be dropped.

A priority value may also be assigned to each rule in the map (step 903). Action sets corresponding to higher priority rules are executed before action sets corresponding to lower priority rules. Action sets corresponding to rules having identical priority values can be executed based on the order of the rules within a data structure (e.g., a programmable flow table).

Because each rule is associated with a separately-actionable action set and a priority value, the entire map (i.e., all rules) can be concurrently applied to an incoming data packet (step 904). Accordingly, a programmable switch could simultaneously apply multiple rules rather than sequentially apply individual rules as would conventionally occur. While each rule in the map is typically associated with a distinct action set, it may be useful for some rules to share a common action set. For example, data packets satisfying two different filtering criteria may be handled the same way.

Unless contrary to physical possibility, it is envisioned that the steps may be performed in various sequences and combinations. For example, the steps of the process could be executed by a network visibility appliance or a controller/client communicatively coupled to the network visibility appliance. Other steps could also be included in some embodiments.

Processing System

Figure 10:
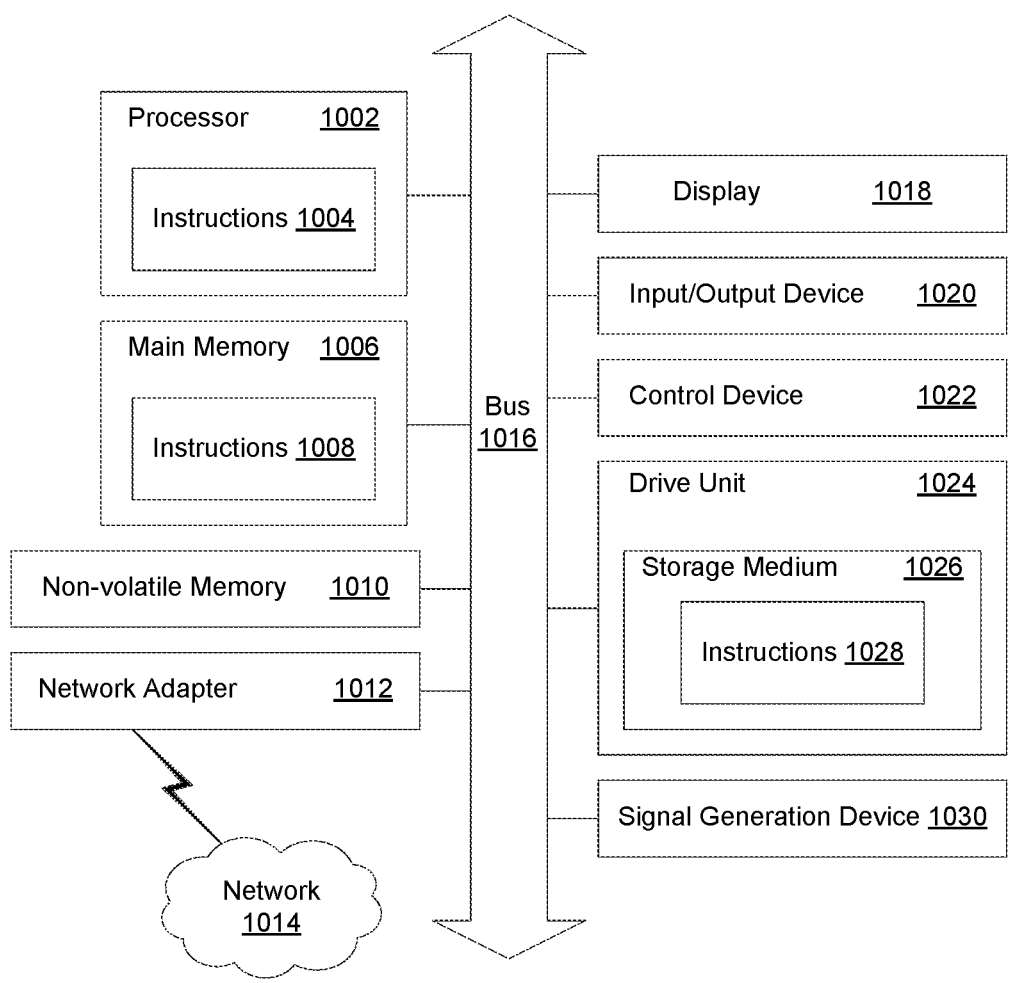
FIG. 10 is a block diagram illustrating an example of a processing system in which at least some operations described herein can be implemented.

FIG. 10 is a block diagram illustrating an example of a processing system 1000 in which at least some operations described herein can be implemented. For example, the processing system 1000 may be responsible for generating an interface through which an end user modifies the visibility fabric including one or more visibility platforms, interacts with a graph representing the visibility fabric, etc. As another example, at least a portion of the processing system 1000 may be included in a computing device (e.g., a server) that supports a cloud computing platform. The process system 1000 may include one or more processors 1002, main memory 1006, non-volatile memory 1010, network adapter 1012 (e.g., network interfaces), display 1018, input/output devices 1020, control device 1022 (e.g., keyboard and pointing devices), drive unit 1024 including a storage medium 1026, and signal generation device 1030 that are communicatively connected to a bus 1016. The bus 1016 is illustrated as an abstraction that represents any one or more separate physical buses, point to point connections, or both connected by appropriate bridges, adapters, or controllers. The bus 1016, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of a network appliance, such as a switching engine, network port(s), tool port(s), etc.

In various embodiments, the processing system 1000 operates as a standalone device, although the processing system 1000 may be connected (e.g., wired or wirelessly) to other devices. For example, the processing system 1000 may include a terminal that is coupled directly to a network appliance. As another example, the processing system 1000 may be wirelessly coupled to the network appliance.

In various embodiments, the processing system 1000 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the processing system 1000.

While the main memory 1006, non-volatile memory 1010, and storage medium 1026 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 1028. The term "machine-readable medium" and "storage medium" shall also be taken to include any medium that is capable of storing, encoding, or carrying a set of instructions for execution by the processing system 1000 and that cause the processing system 1000 to perform any one or more of the methodologies of the presently disclosed embodiments.

In general, the routines that are executed to implement the technology may be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in a computer, and that, when read and executed by one or more processing units or processors 1002, cause the processing system 1000 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 1010, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 1012 enables the processing system 1000 to mediate data in a network 1014 with an entity that is external to the processing system 1000, such as a network appliance, through any known and/or convenient communications protocol supported by the processing system 1000 and the external entity. The network adapter 1012 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1012 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method comprising:
   identifying a plurality of network objects that are interconnected through a network visibility appliance that is coupled to a public cloud infrastructure accessible to multiple users;
   associating each network object of the plurality of network objects with an action set to be applied to incoming data packets;
   constructing a data structure indicative of the network visibility appliance by
      creating a separate entry in the data structure for each network object of the plurality of network objects, and
      establishing an association between a pair of entries in the data structure for each traffic flow between a pair of network objects of the plurality of network objects,
      wherein each action set includes at least one of
         a pass action represented in the data structure as an established association, or
         a drop action represented in the data structure as a lack of established associations, and
      wherein a particular action set corresponding to a particular network object includes a plurality of actions to be concurrently applied to the incoming data packets, the plurality of actions including a plurality of pass actions that are represented as a plurality of established associations between a particular entry associated with the particular network object and a plurality of other entries;
   acquiring, from the public cloud infrastructure, data packets indicative of traffic associated with a given user of the multiple users;
   routing the data packets acquired from the public cloud infrastructure through the plurality of network objects based on the data structure; and
   forwarding at least some of the data packets acquired from the public cloud infrastructure that were not dropped by the plurality of network objects to the public cloud infrastructure.

2. The computer-implemented method of claim 1, wherein each action of the plurality of actions is associated with a certain type of data packets.

3. The computer-implemented method of claim 1, further comprising:
   causing a graph that visually represents the network visibility appliance to be presented on a display of a computing device; and enabling an individual to specify a modification to the network visibility appliance by modifying the graph.

4. The computer-implemented method of claim 3, wherein the modification includes creation of a new association between a first entry corresponding to a first network object and a second entry corresponding to a second network object.

5. The computer-implemented method of claim 4, further comprising:
inserting a new pass action into the action set corresponding to the first network object.

6. The computer-implemented method of claim 1, wherein the data packets are replicated when leaving a network object corresponding to an entry having a plurality of established associations.

7. The computer-implemented method of claim 1, wherein the plurality of network objects includes at least one of a raw endpoint, a tunnel endpoint, an application endpoint, or a map.

8. The computer-implemented method of claim 7, wherein
each raw endpoint, if any, receives traffic from a Network Interface Card (NIC) of the network visibility appliance,
each tunnel endpoint, if any, receives traffic from, or sends traffic to, an environment outside of the network visibility appliance,
each application endpoint, if any, receives traffic from, or sends traffic to, an application program, and
each map, if any, includes a rule for managing traffic.

9. The computer-implemented method of claim 1, wherein the network visibility appliance receives the incoming data packets from an agent on a virtual machine belonging to the given user.

10. The computer-implemented method of claim 9, further comprising:
establishing a tunnel for delivering the traffic from the agent to the network visibility appliance.

11. The computer-implemented method of claim 1, wherein said forwarding causes the data packets that were not dropped by the plurality of network objects to be made available to a virtual machine associated with the given user.

12. A computer-implemented method comprising:
identifying, by a controller, a map that includes a plurality of rules for filtering data packets from a traffic stream,
wherein each rule of the plurality of rules is associated with a different filtering criterion, and
wherein each rule is considered a match when a corresponding filtering criterion is satisfied;
associating, by the controller, each rule of the plurality of rules with an action set,
wherein each action set is to be executed only when a corresponding rule is considered to be matched; and
causing, by the controller, the map to be implemented by a network visibility appliance that is communicatively coupled to the controller,
wherein the map is implemented so that the network visibility appliance concurrently applies all rules of the plurality of rules associated with different filtering criteria to a data packet received by the network visibility appliance.

13. The computer-implemented method of claim 12, wherein each action set includes at least one of
a pass action that causes data packets satisfying the filtering criterion to be forwarded downstream to a network object, or
a drop action that causes data packets that do not satisfy the filtering criterion to be dropped.

14. The computer-implemented method of claim 13, wherein the network object has access to the map through a network fabric.

15. The computer-implemented method of claim 12, wherein at least two rules of the plurality of rules share an action set.

16. The computer-implemented method of claim 12, further comprising:
assigning a priority value to each rule of the plurality of rules.

17. The computer-implemented method of claim 16, wherein action sets corresponding to higher priority rules are to be executed before action sets corresponding to lower priority rules.

18. The computer-implemented method of claim 16, wherein action sets corresponding to rules having identical priority values are to be executed based on an order of the rules within a data structure.

19. A programmable switch comprising:
an ingress port at which to receive a data packet transmitted by an agent on a virtual machine over a network to which the programmable switch is coupled,
wherein the data packet is included in a stream of data packets indicative of traffic handled by a cloud computing platform of which the virtual machine is a part; and
a processor configured to:
identify a plurality of data structure entries associated with a map to be applied to the received data packet,
wherein the map includes a plurality of rules, each rule being associated with a respective data structure entry that includes
a filtering criterion, and
an action set that is to be executed on the data packet only when the data packet satisfies the filtering criterion;
concurrently apply all rules of the plurality of rules in the map to the data packet to identify at least one matching rule; and
in response to identification of the at least one matching rule, executing at least one action set corresponding to the at least one matching rule in order of priority.

20. The programmable switch of claim 19, wherein priority is determined based on a priority value assigned to each rule of the plurality of rules.

21. The programmable switch of claim 19, further comprising:
a data store that includes a data structure populated with the plurality of data structure entries corresponding to the plurality of rules.

22. The programmable switch of claim 21, wherein the data store is a ternary content-addressable memory (TCAM), and wherein the data structure is a programmable flow table.

* * * * *